March 25, 1952 K. W. McLOAD 2,590,531
SELECTOR ARRANGEMENT FOR SEISMIC PROSPECTING SYSTEM
Filed March 10, 1948 9 Sheets-Sheet 1

INVENTOR
KENNETH W. McLOAD
BY Sidney A. Johnson
Attorney

March 25, 1952 K. W. McLOAD 2,590,531
SELECTOR ARRANGEMENT FOR SEISMIC PROSPECTING SYSTEM
Filed March 10, 1948 9 Sheets-Sheet 2

INVENTOR
KENNETH W. McLOAD
BY
Sidney A. Johnson
Attorney

March 25, 1952 K. W. McLOAD 2,590,531
SELECTOR ARRANGEMENT FOR SEISMIC PROSPECTING SYSTEM
Filed March 10, 1948 9 Sheets-Sheet 3

INVENTOR
KENNETH W. McLOAD
BY Sidney A. Johnson
Attorney

INVENTOR
KENNETH W. McLOAD
BY Sidney A. Johnson
Attorney

March 25, 1952      K. W. McLOAD      2,590,531
SELECTOR ARRANGEMENT FOR SEISMIC PROSPECTING SYSTEM
Filed March 10, 1948      9 Sheets-Sheet 5

INVENTOR
KENNETH W. McLOAD
BY Sidney A. Johnson
Attorney

March 25, 1952  K. W. McLOAD  2,590,531
SELECTOR ARRANGEMENT FOR SEISMIC PROSPECTING SYSTEM
Filed March 10, 1948  9 Sheets-Sheet 6

INVENTOR
KENNETH W. McLOAD
BY Sidney A. Johnson
Attorney

March 25, 1952 K. W. McLOAD 2,590,531
SELECTOR ARRANGEMENT FOR SEISMIC PROSPECTING SYSTEM
Filed March 10, 1948 9 Sheets-Sheet 7

INVENTOR
KENNETH W. McLOAD
BY Sidney A. Johnson
Attorney

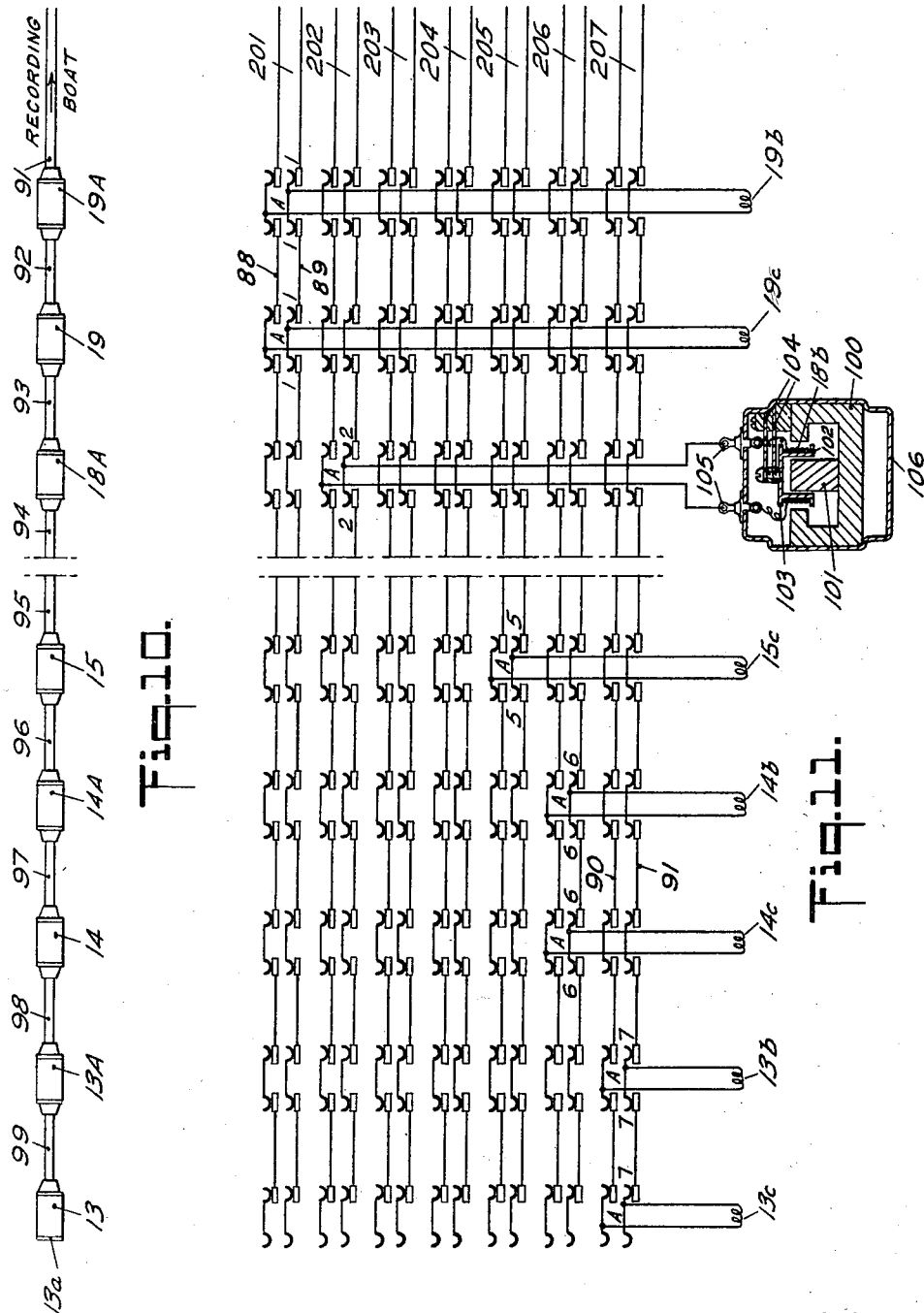

March 25, 1952     K. W. McLOAD     2,590,531
SELECTOR ARRANGEMENT FOR SEISMIC PROSPECTING SYSTEM
Filed March 10, 1948     9 Sheets-Sheet 9

INVENTOR
KENNETH W. McLOAD
BY Sidney A. Johnson
Attorney

Patented Mar. 25, 1952

2,590,531

UNITED STATES PATENT OFFICE 2,590,531

SELECTOR ARRANGEMENT FOR SEISMIC PROSPECTING SYSTEM

Kenneth W. McLoad, Dallas, Tex., assignor, by mesne assignments, to Socony-Vacuum Oil Company, Incorporated, New York, N. Y., a corporation of New York Application March 10, 1948, Serial No. 14,115

9 Claims. (Cl. 177—352)

1

This invention relates to geophysical prospecting and more particularly to seismic surveying in areas covered by water, as over coastal areas, and has for an object the provision of a method and apparatus to facilitate carrying on such surveys in a minimum of time and during rough weather conditions that would otherwise necessitate cessation of operations.

Due to the generally accepted belief and the knowledge that there are substantial oil or petroleum deposits in coastal areas covered by water, it has become most desirable to conduct seismic surveys for sub-surface mapping of such areas in order to locate characteristic sub-surface formations which provide the most likely locations for the drilling of wells.

The difficulties encountered in conducting seismic surveys in submerged areas will be apparent when it is considered that seismic detectors must be placed along a predetermined line at predetermined intervals and oriented in a predetermined position at each location along that line. The geophones comprising a spread, in conformance to techniques used on land, are usually located at regularly spaced points along the line and must be oriented in such a position, usually vertical, that the instantaneous voltage of a geophone will be of the proper polarity with respect to the seismic waves to be recorded and of the same polarity as the other geophones of the spread. Further, a spread of geophones, as used in present day seismograph practice to produce a record, comprises at least two geophones per trace although it is often preferable to utilize a number greater than this in order to eliminate near-surface effects. This means that the spread, in order to produce a useful record of six or seven traces, will comprise twelve, fourteen, or more geophones, each of which must be positioned at predetermined locations with respect to a line along which the seismic survey is being conducted.

Further, it is necessary to provide geophones in which the operating parts are fluid sealed, a pair of insulated conductors extending from each geophone to the associated recording instruments, and some means and/or method by which each of the geophones may be placed at some predetermined point in or on the water in such a position that the geophones will be sensitive to the seismic waves to be recorded.

There have been several different approaches to the problem. Three of the suggested solutions are characterized respectively by (1) mounting each geophone in a separate float or boat; (2) suspending each geophone from buoys on a low-frequency system at some intermediate depth; and (3) providing means whereby the geophones, upon removal of a towing force will descend to, and rest upon, the ocean floor.

The desirability of having a plurality of geophones comprising a spread and their associated conductors so arranged that they may be towed from one location to another has been recognized. However, in such systems the electrical conductors connecting each of the geophones in the spread to recording apparatus in a towing unit must be sealed or provided with a water-tight insulating arrangement in order to prevent short-circuiting of the conducting paths by the entrance of water. At the same time, provision must be made for repairs in event of failure of any of the detector units or of the circuits of the system.

Further, in seismic prospecting it is often desirable that signals from two or more geophones in a spread may be mixed by providing a common conducting path from each of such geophones to the recording instruments. A system having a maximum degree of flexibility is one in which any of the detector units of the spread may readily be connected to any other detector and to the recorder. The present invention, in one form thereof, provides means for readily assembling geophones and cable units to form a spread in which any desired inter-mixing of the geophones may be effected. Connections are made in such a manner that the possibility of the circuits becoming shorted at the point of connection is eliminated. More particularly, a plurality of cable sections and geophones designed to be connected together in end-to-end relation are provided with terminal members, preferably in such array that contact is made in the electrical circuits as the mechanical connection is made between cable sections and the geophone housings. The terminal members, which may be jacks and plugs preferably are symmetrically disposed with respect to the axis of the cable sections and the geophone housings. With such symmetry the geophones may be assembled to the cable sections in any one of a plurality of different angular positions, thereby selectively to connect any one geophone element to any one of a plurality of pairs of conductors in the cable sections.

The present invention is primarily directed to the cable-selector arrangement by means of which geophones may be connected in any desired circuit leading to the recorder. The broader aspects of the system with which the present invention is illustrated forms the subject matter of an application filed concurrently herewith by Goethe M. Groenendyke, Serial No. 14,027, and assigned to the same assignee as the present application.

For further objects and advantages of the invention, reference shall now be had to the following description taken in conjunction with the drawings in which:

Fig. 10 is a modified form of apparatus of Fig. 1;

Figure 2:
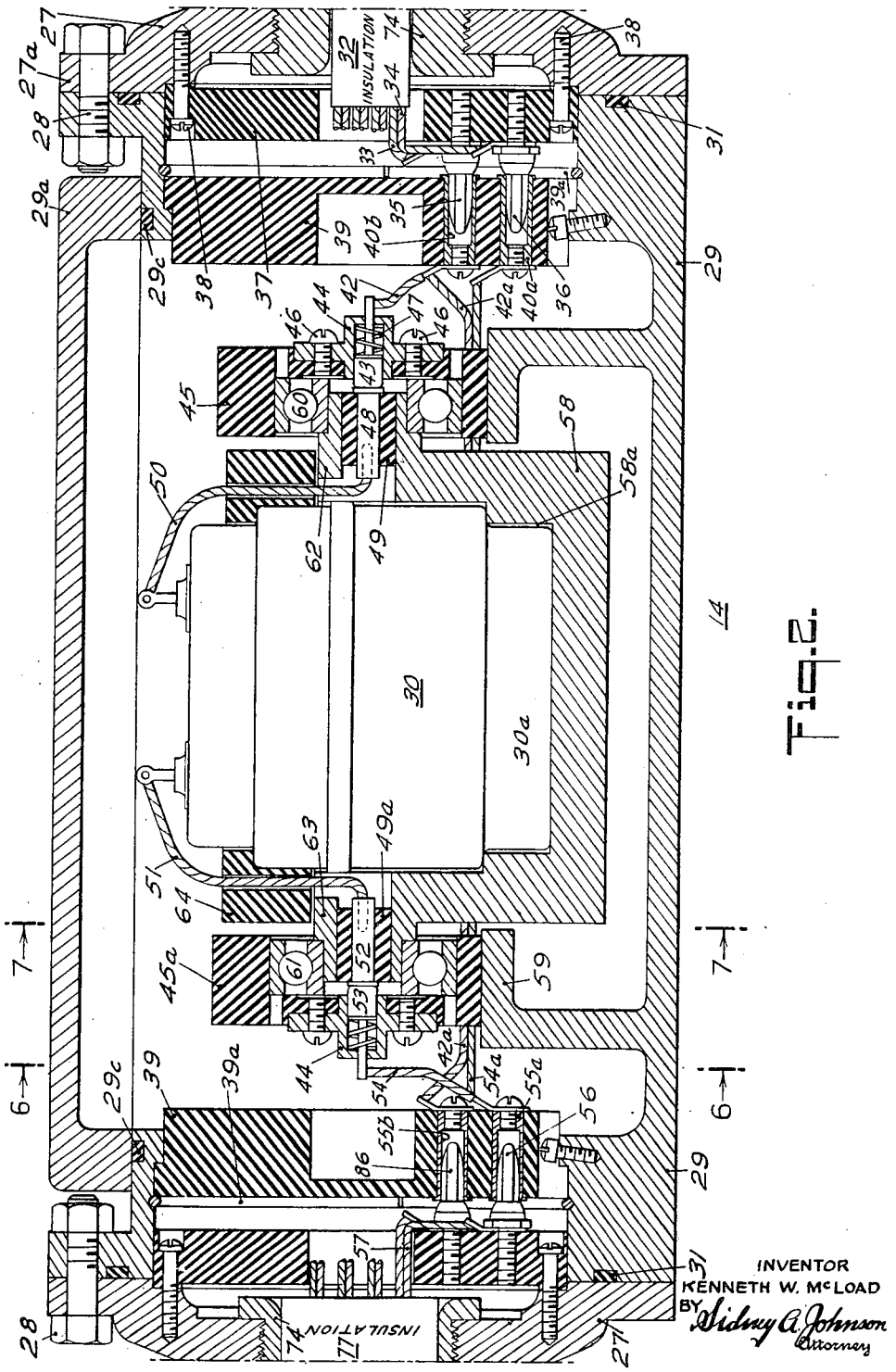
Fig. 2 is a sectional elevation of a part of the apparatus in Fig. 1 including a portion of the cable connector assembly with all but two of the electrical conductors being omitted.
Figure 13:
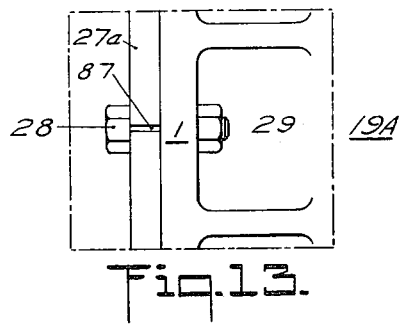
Figure 12:
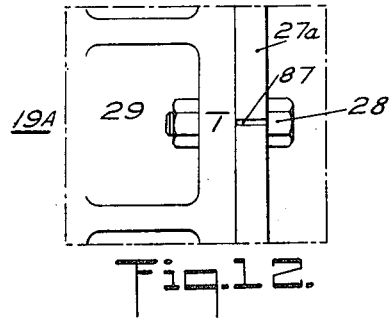
Figure 15:
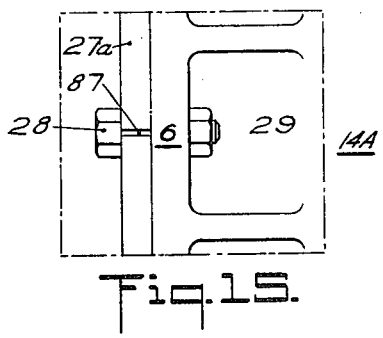
Figure 14:
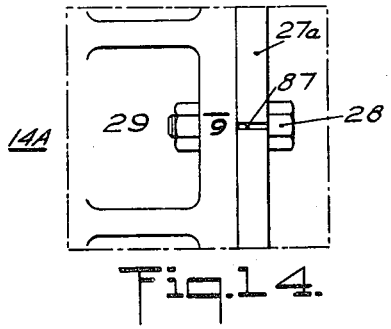
Figure 16:
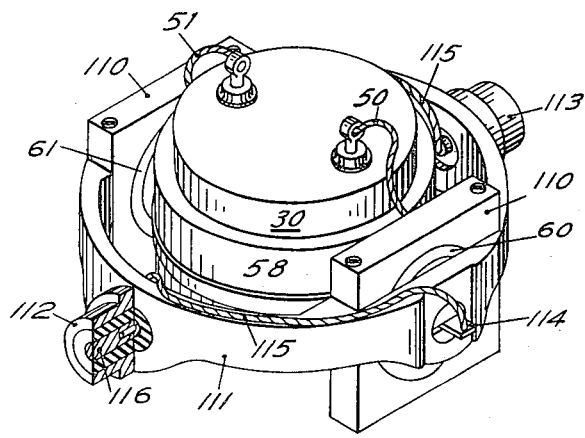

Fig. 11 diagrammatically illustrates the cable of Fig. 10 showing one way in which the geophones may be connected;

Fig. 12 is an enlarged view of a section of the right end of those portions of the cable which house geophones 19 and 19A;

Fig. 13 is an enlarged view of a section of the left end of those portions of the cable which house geophones 19 and 19A;

Fig. 14 is an enlarged view of the righthand end of geophones 14 and 14A;

Fig. 15 is an enlarged view of a portion of the lefthand end of geophones 14 and 14A; and Fig. 16 is a perspective view of the geophone unit of Fig. 2 mounted in a double gimbal arrangement.

Figure 1:
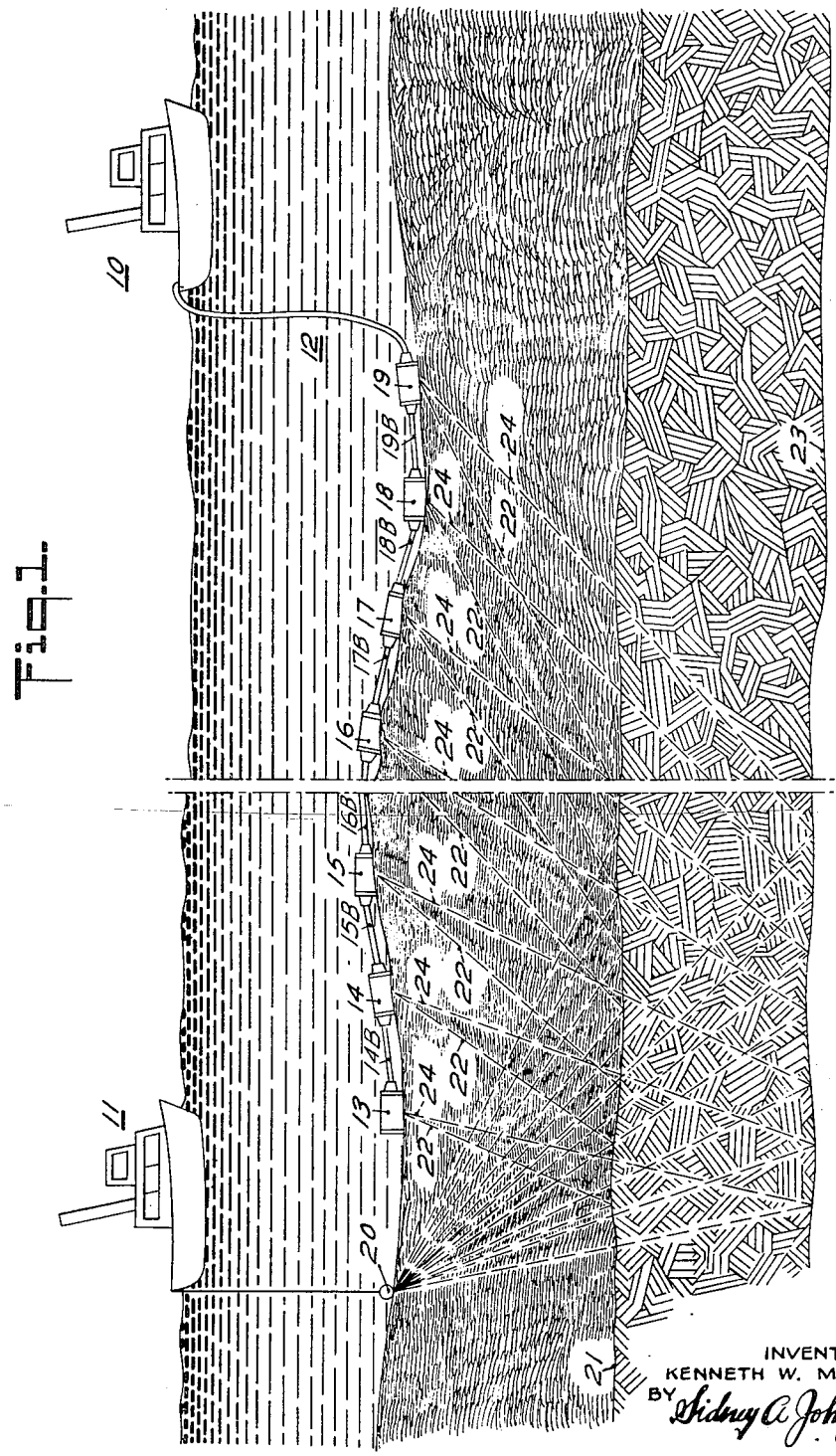
Fig. 1 is a sectional view of a submerged area illustrating an under water surveying apparatus utilizing the present invention.

Referring to the drawings, there has been illustrated in Fig. 1 a seismic surveying apparatus utilizing the invention in an area covered by water in which a seismic survey is to be conducted. As shown in the drawings the surveying apparatus and the associated vessels or boats are anchored in suitable positions. More specifically, the recording boat 10 is anchored, although the anchor is not illustrated, in a position in advance of the shooting boat 11. From the recording boat 10 there extends that part of the seismic surveying apparatus with which the present invention is concerned; more specifically, there extends from the boat 10 a cable which, as more fully explained hereinafter, includes tension elements to give to the cable adequate strength to withstand the maximum tensional forces capable of development by the boat 10, and the electrical conductors which complete electrical circuits to the geophones which comprise the spread. Seven geophone units or assemblies 13—19 are shown in Fig. 1, although it is to be understood that the spread may consist of any desired number of geophone units such as the previously mentioned twelve, fourteen, or more units. For the purposes of clarity and simplicity in the explanation of one adaptation of the invention the simple 7-geophone spread has been illustrated. For the same reason, it will be assumed in the following description that the signals from these seven geophones 13—19 are to be transmitted unmixed to the recording instruments carried by boat 10 where the signals will be recorded on six or seven traces.

As is well understood by those skilled in the art, seismic surveying may be conducted by positioning the geophones comprising the spread at predetermined locations along a line, ordinarily straight, over which the survey is to be made. With the geophones positioned as in Fig. 1, a charge of dynamite suitably located with respect to the spread is detonated to generate seismic waves. Where the survey is to be conducted in areas covered by water, it becomes feasible to lower from the shooting boat 11 a charge 20 of dynamite to the underwater bed or bottom, the weight of the water itself providing the necessary tamping. Upon exchange of proper signals between the recording boat 10 and the shooting boat 11, the charge of dynamite 20 is detonated to generate the seismic waves which thereupon travel downwardly through the earth. Upon reaching an interface or boundary of two sub-surface strata of differing properties, a part of the seismic energy is reflected. The paths of energy traveling to and reflected from the interface 21 have been indicated by the lines 22, while the travel paths of energy traveling to and reflected from the interface 23 have been indicated by the lines 24. As the reflected energy arrives at the geophones 13—19, seismic signals are generated by each geophone which are transmitted to the recorder by way of the conductors included in the cable 12. The time required after the detonation of the charge of dynamite 20 until the completion of the recording period is of the order of a few seconds. Since this time is so short, it will be readily understood that there is great economic value to provide a system which will reduce the time required to arrange the equipment in preparation for succeeding "shots" and subsequent recording periods. More specifically, after the detonation of the charge 20 the shooting boat 11 moves to a position in advance of the recording boat 10, and at a predetermined location there is lowered to the underwater floor or bottom a further charge of dynamite which will be detonated and further seismic records made. While the shooting boat 11 remains at its new location, the recording boat 10 will then move forward, towing and dragging the surveying equipment forming a part of the cable 12 after it until a new and predetermined position is reached. All geophones are at all times properly spaced, properly oriented and when stationary are immediately ready to receive seismic signals for the recording of data resulting from the detonation of succeeding charges from the shooting boat 11 in its new position. From the foregoing description of a surveying apparatus to be used in submerged areas, it will be readily apparent that the apparatus embodies features substantially different from apparatus used in land surveys. If the cable is to be towed from one spread to another, it must be relatively smooth and streamlined in order to minimize the possibility of becoming entangled with underwater obstructions.

In the present invention means are provided for connecting the cable sections and the geophones in such a relatively smooth, streamlined unit. The electrical paths over which signals from the geophones may be conducted through the cable sections to the recording apparatus on boat 10 are completed through each of the geophone housings, such as the housing 29 of Fig. 2, in a manner which conforms to the aforementioned requirement of a relatively smooth streamlined unit. At the same time the area in which connections are made is sealed to prevent entry of moisture or water thereinto, thus preventing a shorting of the circuits. The connections are so arranged on cooperating units that by rotation of a cable section about its longitudinal axis with respect to the adjacent geophone or the geophone to be connected thereto, signals generated in that particular geophone may be transmitted over any one of a plurality of pairs of conductors in the cable 12. With the foregoing general understanding of one application of the invention and the manner in which it operates, reference will now be had to the detailed drawings, particularly Fig. 2 which is a sectional view of that part of the cable 12 which includes the electrical connections between cable sections and geophone assembly or geophone unit 14.

Figure 5:
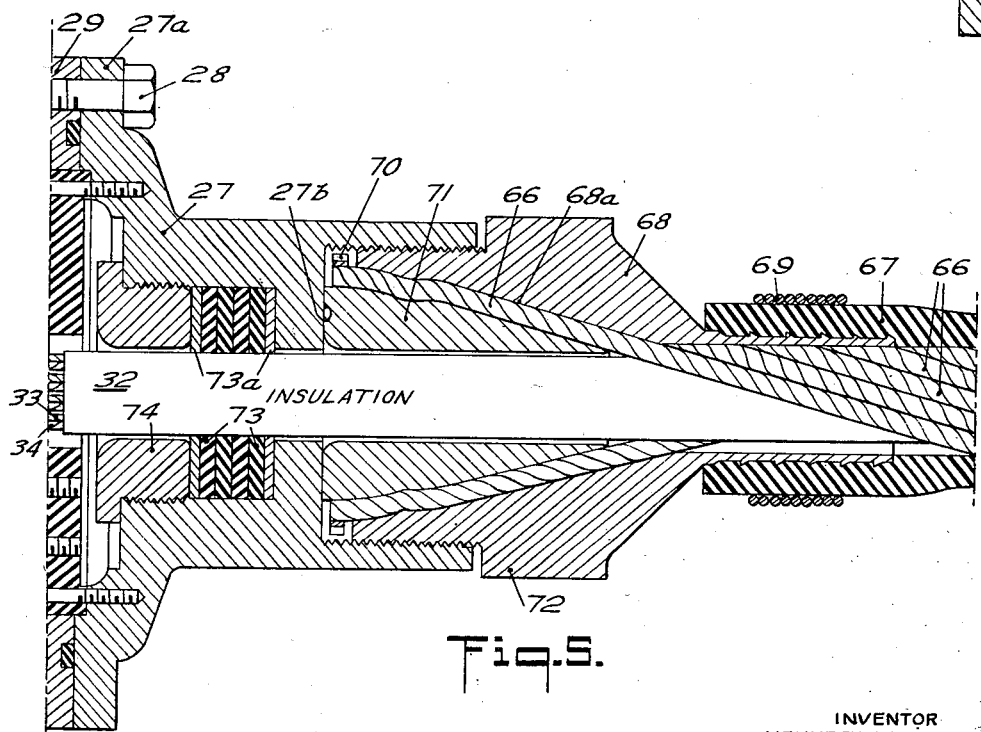
Fig. 5 is a sectional view of a modified form of a cable connector assembly.
Figure 6:
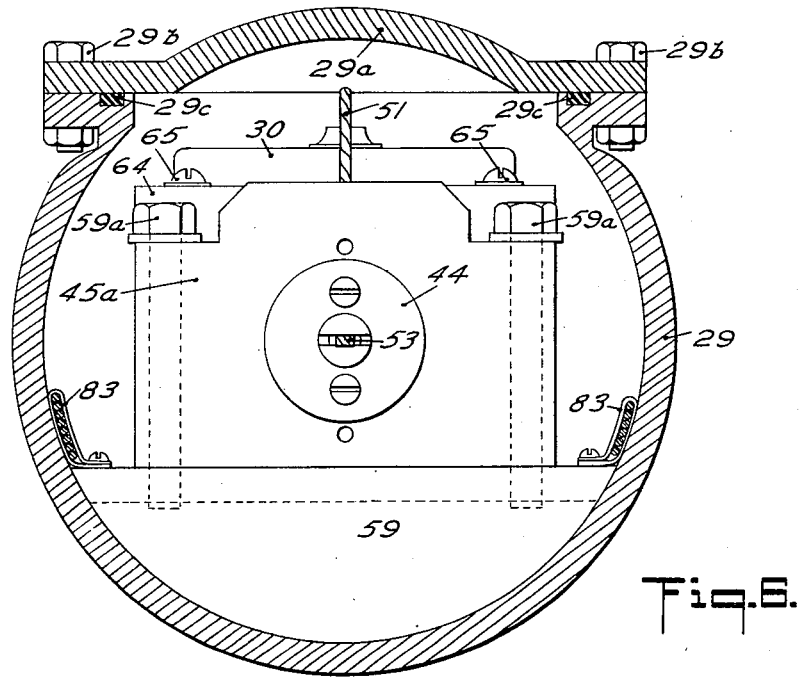
Fig. 6 is a sectional view of Fig. 2 taken along line 6—6.
Figure 7:
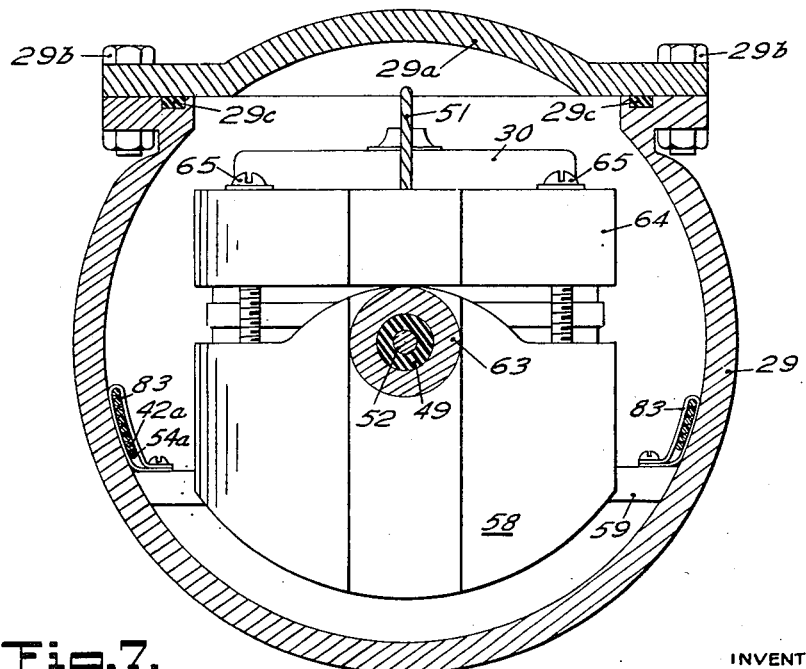
Fig. 7 is a sectional view of Fig. 2 taken along line 7—7.

Referring to Fig. 2, section 15B of the cable 12 between the geophone assembly 14 and the assembly 15 has been terminated at the right of Fig. 2 in a plug housing or closure member 27, which is shown in detail in Fig. 5. The plug housing, as shown in both Figs. 2 and 5, is provided with a flange 27a which, by means of a series of bolts 28, is attached to a flange face of the housing 29 in which a seismic wave detector or geophone 30, Fig. 2 is mounted. The housing 29 is provided with an opening, best shown in Fig. 9, through which parts may be introduced in construction. A lid 29a is fastened to the case 29 by bolts 29b with gasket 29c effecting a watertight seal as shown in Figs. 2, 6 and 7. To provide a watertight seal at the junction of plug 27 and the ends of housing 29, a gasket 31 is provided between the flange face of housing 29 and the flange 27a. The electrical conductors are carried in an insulating jacket or cable 32 which may be of rubber or other suitable flexible insulating material. In Fig. 2 only eight of the fourteen lead wires or conductors of cable 32 appear, two of them, the conductors 33 and 34, serve to complete connections to the detector or geophone 30. A more detailed discussion of the manner in which the remaining conductors extend through the housing 29 will be later referred to, particularly in connection with Figs. 6–9.

The conductors 33 and 34 are connected to plugs 35 and 36 carried by and supported from a ring 37 of electrical insulating material which is itself secured to the plug housing 27 by means of screws 38. Plugs 35 and 36 are illustrated as nesting within and making good electrical contact with jacks 40a and 40b carried in an electrical insulating member 39 fastened in the end of housing 29 by spring 39a. From the jack 40b a conductor 42 is electrically connected to a rectangular shank of a spring-biased contact plunger 43 supported in a flanged cylinder 44 which is attached to a bearing support 45 of insulating material, as by screws 46. A spring 47 within the closed end of the cylinder 44 urges the contact plunger 43 against a butt contact 48 carried in an insulating member 49. From the contact 48 connection is made by conductor 50 to the sensitive element of the detector or geophone 30. Connection to the other terminal of geophone 30 is by way of conductor 51 and through a like assembly including a butt contact 52 and a spring-biased contact plunger 53 and thence by conductor 54 to a jack 55a and to a plug 56 to which is connected a conductor 57 of section 14B of the cable 12.

Figure 3:
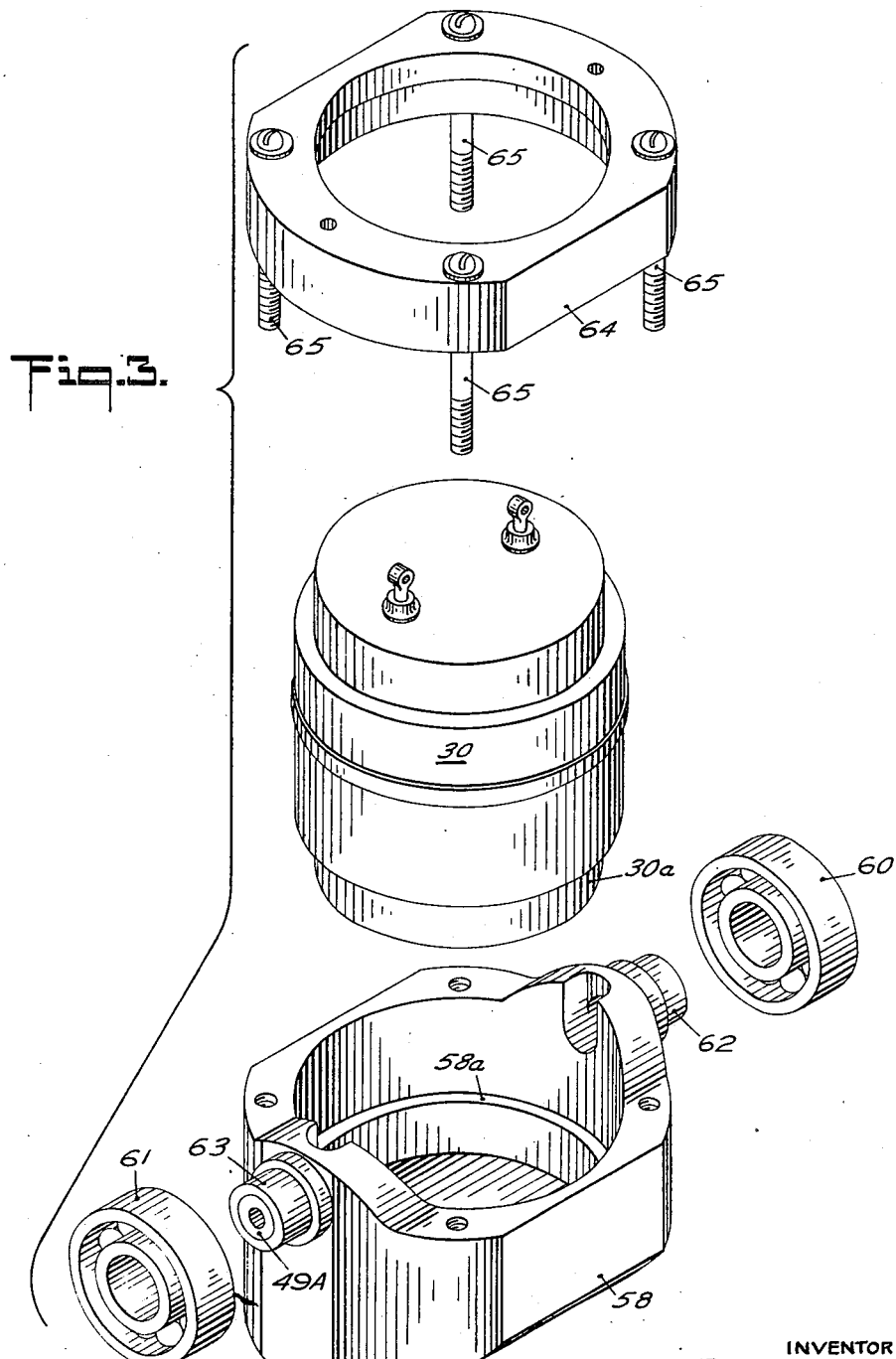
Fig. 3 is an exploded view of a gimbal mounting provided for the detector unit of the system of Fig. 1.

It will be observed in Fig. 1 that each geophone unit or assembly forms in the cable 12 a bulge or enlargement, but not one either of length or of diameter too great to prevent the handling of the cable as a whole as by a reeling drum or the like. Notwithstanding the compactness of the geophone assembly, there are incorporated therein provisions for assuring that the detector unit or geophone 30 will always be in a position for the most favorable reception of seismic signals. In dragging or towing the cable 12 along the bottom of the submerged area being explored, the cable may tend to turn about on its longitudinal axis. It is provided, however, that each detecting unit will remain oriented and will be maintained in a vertical position. Referring to Fig. 2 and the exploded view Fig. 3, this is accomplished by supporting the geophone unit 30 in a cradle 58, the lower end of which, as viewed in Figs. 2 and 3, is of heavy construction to position well below the axis of rotation of shafts 62 and 63 the center of gravity of the assembly, thus to impart to the geophone 30 and the cradle 58 a strong gravity bias which, in the manner of a pendulum, maintains the geophone 30 in a vertical position. Preferably, the cradle 58 is supported by anti-friction bearings, illustrated as ball bearing assemblies 60 and 61, the assembly 60 being carried by bearing support 45 of insulating material, while the bearing 61 is carried by the insulating support 45a. The supports 45 and 45a are mounted on angular ribs 59 by bolts 59a, as shown in Fig. 6.

It will be observed the cradle 58 is provided with cylindrical extensions or center-bored shafts 62 and 63 which are pressed into the inner race of the respective ball bearing assemblies 60 and 61, each cylindrical extension having pressed therein an insulating bushing, such as the bushing 49 for the contact 48. It is to be further observed that the axis of the cylindrical extensions or stub-shafts 62 and 63 is in line with, or coaxial of, the cable 12. The seismic detector or geophone 30 is provided with its own housing, generally hermetically sealed (Fig. 11) with terminals extending therefrom for connection to the conductors 50 and 51 of Fig. 2. The cradle 58, as best shown in Fig. 3, is generally cylindrical in shape, closed at the bottom and has an inner diameter of a length to receive therein the housing of the geophone 30. In the form illustrated the lower end of the geophone 30 has one end 30a of reduced cross-section, and the cable 58 is provided with a re-entrant opening 58a which serves to form a seating ledge for the larger diameter section of the geophone housing. The geophone is clamped into the cradle by means of a fiber clamping member 64 through which there extend clamping bolts 65, Figs. 3, 6 and 7.

It is quite apparent from Figs. 2, 3, 6 and 7 that since most of the mass of the heavy brass cradle and geophone assembly is below the pivotal axis, the position of the center of gravity is well below that axis, thus capable of developing considerable torque. Since the spring-biased friction contacts are small in area and effective at a short radius, the frictional torque or drag caused thereby is negligible and the geophone 30 will always take a position with its longitudinal axis vertical, regardless of rotation of the cable and housing about their common longitudinal axis. This automatic positioning of each geophone 30 occurs even though the geophone housing 29 may not itself be horizontal. Thus, as shown in Fig. 1, all of the geophones are more or less inclined to the horizontal with the exception of geophones 13, 15 and 18. Nevertheless, in all of the remaining geophone units each geophone or detector will be positioned by its own cradle so that it is generally vertical, and in all cases each geophone responds to the arrival of seismic waves with the same polarity as every other geophone.

The detector or geophone 30 may itself be of any suitable type, depending upon the character of the survey undertaken and the type or design of recording equipment with which it is used. For example, it may be of a well known velocity type such as the one illustrated in Fig. 11. However, either the displacement, velocity or acceleration type may be utilized as the vibration-sensitive device or seismic detector 30.

With the foregoing understanding of the construction and arrangement of the parts within the geophone unit or assembly 14, it will be understood that each of the remaining assemblies 13 and 15—19 is similarly constructed. The present invention provides that all of the electrical conductors extend throughout the length of cable 12 and from the rear of the boat 10 to the recording instruments carried therein. In Fig. 2 only eight of the multiple conductors of the cable appear, two of which, the conductors 42a and 54a, extend through the case 29. For a seven-geophone spread, there will be at least fourteen separate conductors, each insulated from the other and extending the full length of the cable from the boat 10 to the geophone assembly 13. While it would be possible to terminate two conductors in the assembly 19, to terminate two additional conductors in the assembly 18, etc., to the last assembly 13, it is preferred to have all conductors extend through the entire cable. Thus, all of the intermediate sections of cable respectively disposed between adjacent geophone assemblies are of like construction. Similarly, each geophone assembly is of like construction, which means that any particular section may be removed and another like section substituted therefor. If greater spacings are desired between adjacent geophones, longer interconnecting cables are substituted for the shorter ones.

Thus, the interchangeability and flexibility afforded adapts the surveying apparatus as a whole to any conditions which may be encountered in the field and imparts to it the same degree of flexibility that is had with equipment of the type previously used on land. As has heretofore been mentioned, the cable 12 includes as an integral part thereof an inner electrical cable which consists of the electrical conductors embedded or implanted in the continuous rubber jacket 32. In the form of the cable shown in Fig. 5 the electrical cable 32 has wound about it a plurality of wire ropes 66. The wire-wrapped cable has an outer cover 67 of abrasion-resistant material such as fabric reinforced rubber, either natural or synthetic. The covering 67 is terminated at the juncture of each cable section and geophone assembly, as at a barbed end of the fitting 68, a plurality of turns of wire 69 being effective tightly to hold the outer cover 67 in place. The wire ropes 66 extend inwardly through the fitting 68 and terminate at a ring 70 to which they are suitably secured as by soldering, spotwelding, or the like. The lefthand end of the fitting 68, as viewed in Fig. 5, is threaded into an extension of the plug housing 27. Between a shoulder 27b of the plug housing and the tapered inner surface 68a is a wedging member 71, the lefthand end of which abuts against shoulder 27b. Preferably the fitting 68 in the region indicated by the reference character 72 is made hexagonal or square to receive a wrench or other tool tightly to force the fitting 68 into the plug housing 27. When this is done, the wedge 71 is driven tightly against the wire ropes 66. In this manner the wire ropes 66 are firmly and frictionally connected to the plug housing 27 which, it will be remembered, is in turn bolted to the housing 29 of the geophone assembly 14. With this construction, as each cable section enters a geophone assembly, there is a divorcement between the tension members and the electrical members, the latter thereby being protected against application thereto of any towing forces applied to the tension members of the cable by boat 10. While it is intended that the cable at the barbed end of each of the fittings 68 will be watertight to prevent ingress of seawater, additional protection is provided for the electrical circuits in the geophone and plug assemblies by the provision of a plurality of sealing members 73 shown in the form of rubber washers. They are disposed centrally of the plug housing 27 between the metallic washers 73a. When compressed by a nut or compression member 74 which threadedly engages the housing 27, the rubber washers 73 expand to form, with the electrical cable 32 and with the plug housing 27, a wholly watertight seal.

While the form of cable and cable connector shown in Fig. 5 is preferred and may be utilized on each end of each cable section, other forms may be, and have been, utilized. For example, the cable connector shown in Fig. 4 has been found satisfactory and is of the type which may be readily fabricated without special equipment as is required for the assembly of Fig. 5. To minimize the number of drawings, the arrangement of Fig. 5 has been shown on the righthand side of Fig. 2, while the assembly of Fig. 4 has been shown on the lefthand side of Fig. 2.

Figure 4:
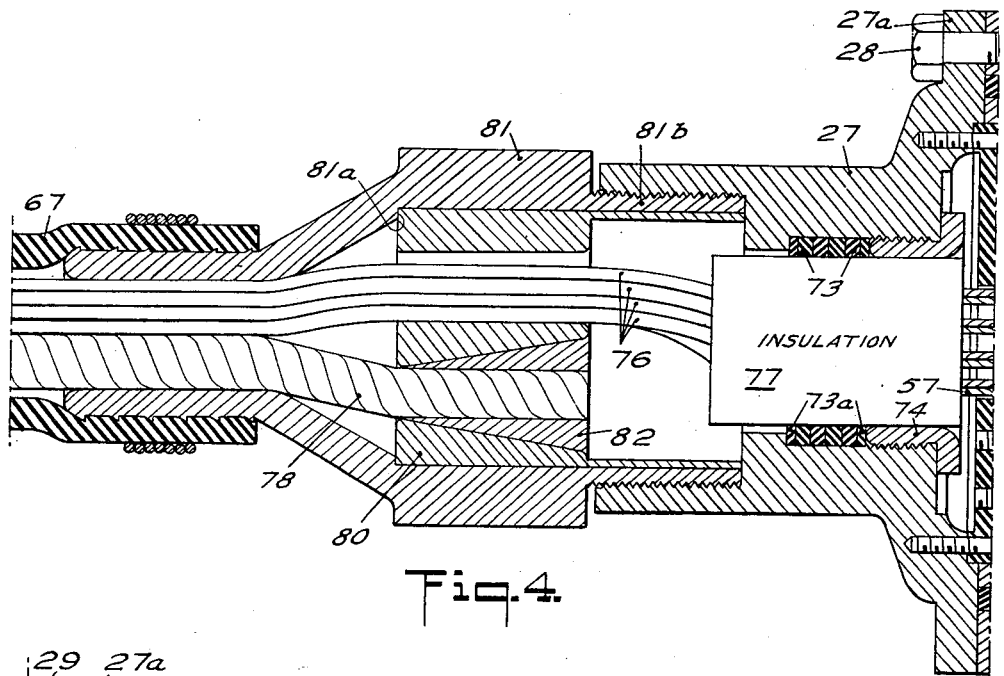
Fig. 4 is a sectional view of the construction of the cable connector assembly at the left of Fig. 2.

Referring now to Figs. 2 and 4, the towing forces are transmitted from the housing 29 through a plurality of bolts 28 to the lefthand plug housing 27. In this case, insulated electrical conductors 76 are molded or vulcanized into a plug 77 of rubber or the like which, with the sealing members 73 and 73a and the nut or compression member 74, forms a watertight connection. In the form of the cable of Fig. 4, the conductors 76 extend through the outer cover 67 together with a braided wire cable 78. The cable 78 is terminated within a wedging member 80 which rests within a fitting 81 and against a shoulder 81a thereof. The wedging member 80 has a tapered socket through which the end of the cable 78 extends. The end of the cable 78 is held in place by the wedge 82 which is shown as welded or brazed to the cable 78. Preferably, before the brazing operation the strands of cable 78 are spread outwardly, and in the brazing or soldering operation they are integrated into a mass to form the wedge-shaped end 82 whose configuration is complementary to that of the tapered socket of member 80. Any tensional force exerted on the cable 78 tends to press the wedge-shaped end 82 and the wedging member 80 more firmly together. The provision of some slack in the wires 76 as they enter plug 77 insures that the wires will not be subject to tensional forces. Thus, from the plug housing 27, the towing forces are transmitted through the threaded end 81b of the member 81 and thence through wedging member 80 to the wedge-shaped end 82 of cable 78, and thence through cable 78 to the remaining geophone assemblies of the surveying apparatus. It is, of course, apparent that the assembly of Fig. 4 may be utilized in lieu of the one of Fig. 5, the important thing being that in any particular surveying equipment all plug assemblies shall be of such uniform construction as will provide interchangeability.

With either cable arrangement of Fig. 4 or Fig. 5, a towing force of any desired magnitude may be applied to the several geophone assemblies without exertion of forces on the electrical cables, and thus the surveying equipment may be moved readily and quickly from one location to another.

Figure 8:
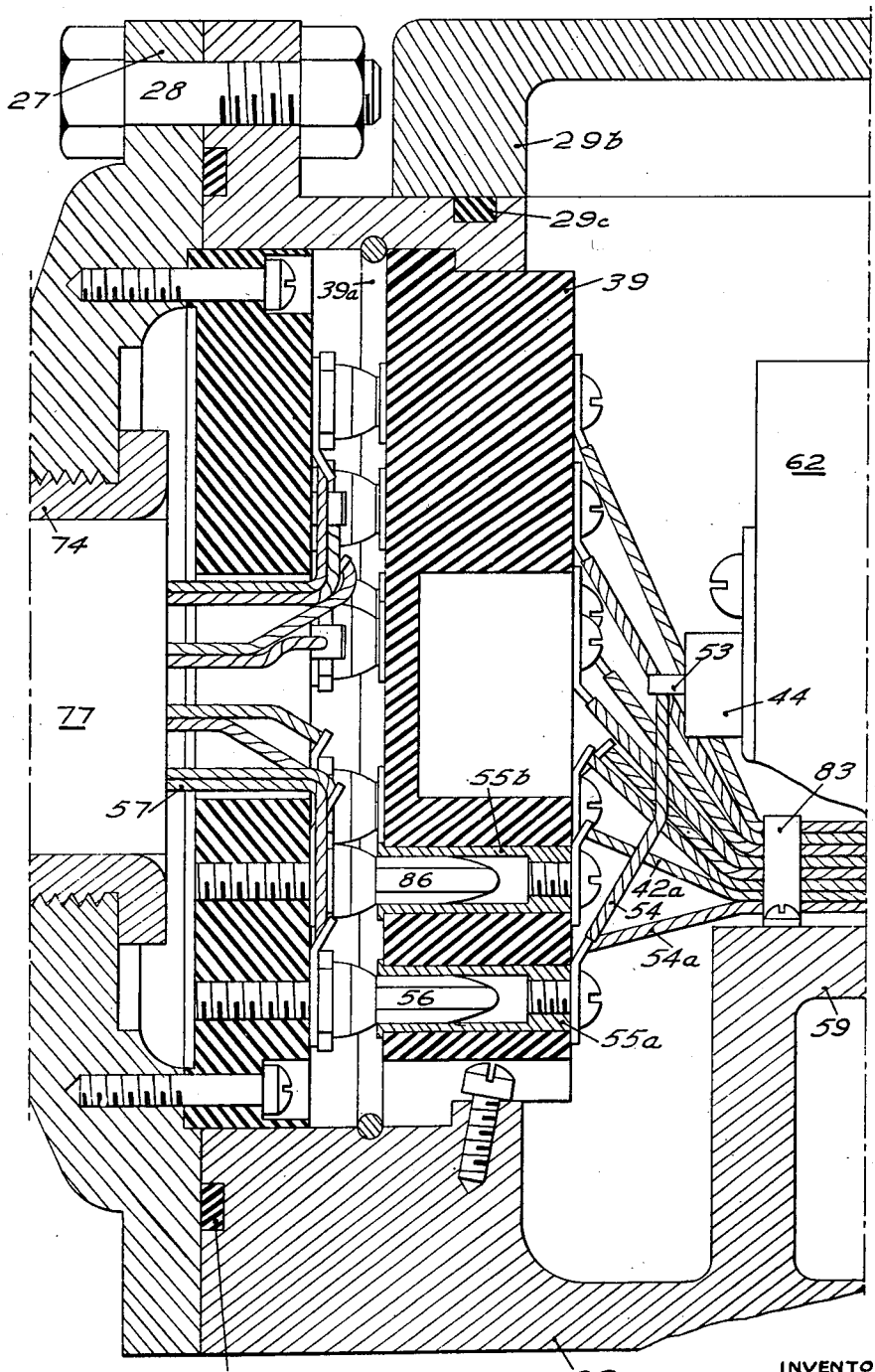
Fig. 8 is an enlarged sectional view of the left end of geophone housing and the cable connector assembly of Fig. 2 illustrating the manner in which the electrical connections are made between the cable sections and geophone housings.
Figure 9:
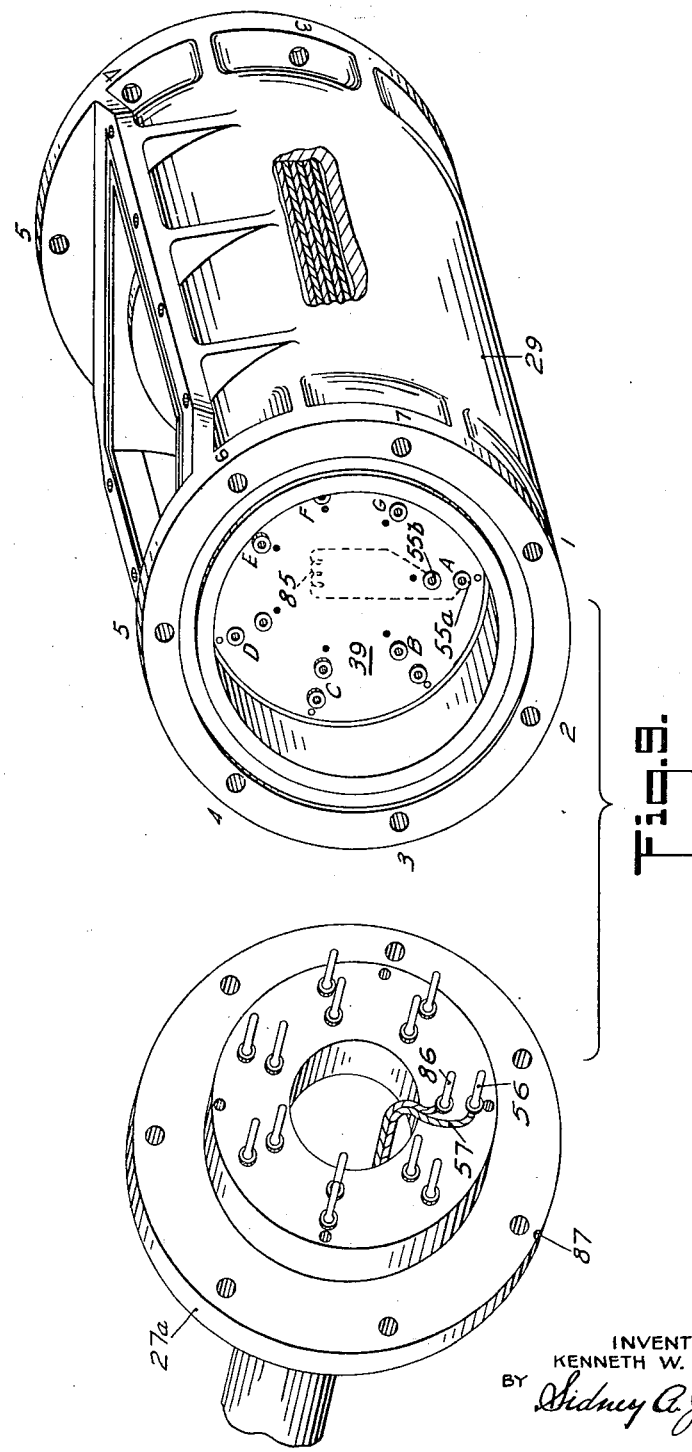
Fig. 9 is a perspective view of circuit connectors in a geophone case and on the cooperating end assembly of a length of cable.

There has already been mentioned the fact that the electrical circuits are continuous from one end of the cable to the other. The manner in which the electrical conductors are continued through the cable has been illustrated with particular reference to the conductors 42a and 54a of Fig. 2 and is best shown in Figs 8 and 9. In Fig. 8, which is an enlarged sectional elevation of the lefthand plug and jack assembly of Fig. 2 there is shown in detail the manner in which the conductors are attached to the jacks carried in the insulating member or disc 39. At a mounting clamp 83 the individual conductors are separated and each individual wire is connected to one of the jacks carried by the insulated disc 39. The two insulating discs 39 located at the right and the left of each geophone assembly, as viewed in Fig. 2, are of identical construction, and the wires or conductors extend therebetween to like locations; that is to say, the same conductor will be connected to the lower-most jack, i. e., 40a and 55a, in the two discs 39 at the opposite ends of each assembly. As shown in Figs. 6 and 7 and in the exploded view of Fig. 9, the conductors including 42a and 54a may be laid side by side against the inner wall of the housing 29 and held there as by clamps 83 of Fig. 8. The six conductors which appear in the right of Figs. 6 and 7 appear in Fig. 9 in the cutaway section. In the embodiment of the invention illustrated, and as previously described, the detector or geophone 30 is electrically connected by conductor 50, contact assembly 48, 43, and by conductor 42 to the jack 40b at the righthand end of Fig. 2; and by conductor 51, contact assembly 52, 53 and by conductor 54 to the jack 55a at the lefthand end of Fig. 2. The jack 40b is connected by the conductor 42a to the jack 55b. Similarly the jack 55a and the jack 40a are interconnected by conductor 54a. It is to be understood that the jacks 40a and 40b are located in the supporting disc (not shown) located at the righthand end of Fig. 9 in the same radial positions as corresponding jacks 55a and 55b carried by disc 39. In like manner the remaining jacks at the respective ends of the housing 29 are interconnected so that electrical circuits extend between each pair of similarly located jacks. It will be understood that the particular construction of plug and jack assemblies shown may be modified or varied, though the system shown is the best form in which the invention has been used.

In the exploded view of Fig. 9 the geophone coil 85 has been illustrated diagrammatically by a dotted line and is shown connected to the jacks 55a and 55b. The two plugs 56 and 86 are arranged to be received by the jacks 55a and 55b. Similarly, additional pairs of jacks and plugs serve to take care of the remaining circuits. Since the plugs and jacks are symmetrically disposed about the axis of the assembly, the plugs may be inserted into any selected jacks, that is the plugs and their cable section may be rotated about the longitudinal axis for movement of plugs 56 and 86 into any selected pair of jacks. Preferably the sensitive element or geophone coil 85 of each geophone is connected to the corresponding jacks of each assembly. The flange 27a may then be secured in the selected position since the bolt holes in flange 27a coincide with those of the housing 29. The advantage of this feature is that at the factory all coils or pickup units will be connected to jacks in like or identical positions, such, for example, as to jacks 55a—55b, 40a—40b of Fig. 2. Each of the pairs of jacks bears identifying characters on the face of the disc or insulating member 39. As shown in Fig. 9, each pair of jacks has been identified by the letters A, B, C, D, E, F, G. The holes in the flange of housing 29 are numbered from 1 to 7, these numerals being stamped on the flange, preferably on the peripheral face thereof. In Fig. 9 only the numbers 6 and 7 appear on the peripheral face of the lefthand flange. For the purpose of the following description the other numerals 1 to 5 are shown outwardly of the flange but in positions corresponding with their stamped locations on the flange. The coils of each of the geophones will be assumed to be connected to corresponding pairs of jacks. For example, the coil 85, diagrammatically shown in Fig. 9, is connected to the jacks 55a and 55b. These jacks, those nearest the numeral 1, will be identified with the code marking "A." Corresponding numerals and letters appear on each geophone assembly in like locations.

For a surveying system in which signals from each geophone are to be separately transmitted to the recorder, the plug-contact assembly including the flange 27a of each section of the cable will be assembled with respect to each geophone housing in a different angular position. For this purpose each flange 27a, Fig. 9, is provided with a marker or index which may be conveniently in the form of a notch 87. Starting with the length of cable from boat 10, Fig.1, the cable flange may be assembled to the housing of the geophone assembly or unit 19 with its index or notch 87 in the No. 1 position. This will connect the coil or detecting element 85 of the unit 19 to a first pair of conductors of the cable 32. The righthand flange of the cable section 19B is positioned in a like manner with its index in the No. 1 position of the lefthand flange of geophone assembly 19. The lefthand flange of cable section 19B is positioned with its index in the No. 2 position of geophone assembly 18, and the righthand flange of the cable section 18b is, likewise, assembled in the No. 2 position of geophone assembly 18, thus connecting the geophone coil of that assembly to a second pair of conductors. Similarly, the flanges of cable sections 17B, 16B, 15B and 14B are respectively associated in positions numbered 3—7 of units 17, 16, 15, 14 and 13 to connect their respective geophone coils to separate pairs of conductors. The assembly of the various flanges in the foregoing manner provides a separate electrical circuit to the recording apparatus from each coil or sensitive element of each detecting unit.

Not only has the foregoing construction the advantage of uniformity in the manufacture of geophone units, but it also provides, in field operations, an exceedingly useful and convenient switching arrangement, since if the associated cable flanges are assembled to two geophone units in like positions, such as the No. 1 position, the two coils of those units will be connected in parallel in a circuit which extends to the recorder. Thus, in the assembly of the surveying apparatus, any two or more geophones may be readily connected in parallel for the mixing of signals therefrom.

Further to illustrate the present invention, Figs. 10 and 11 show a system in which the geophones are connected in pairs, the geophones of each pair being in parallel. In the cable of Fig. 10 fourteen geophone assemblies are utilized, eight of which, the assemblies 13, 13A, 14, 14A, 15, 18A, 19 and 19A, are shown. The cable is assembled with two of its geophones connected to each pair of its conductors. Accordingly, the lefthand flanges of the cable sections 91 and 92 are bolted to geophones 19A and 19 with their notches or indexes in the No. 1 positions; likewise, the righthand flanges of cable sections 92 and 93 are bolted to geophone assemblies 19A and 19 in the No. 1 position. In Fig. 12 a fractional part of the righthand end of the geophone 19A is shown with the cable flange 27a assembled with its index 87 opposite the numeral 1. Similarly, in Fig. 13 the lefthand end of geophone assembly 19A is shown with the cable flange 27a assembled with its index in the No. 1 position. The righthand end of geophone assembly 19 and its cable section 92 will be assembled as shown in Fig. 12, while the lefthand end will be the same as shown in Fig. 13. As a further example as to how the cable sections are assembled, reference may be had to Figs. 14 and 15 which fractionally illustrate the associated flanges of geophone assembly 14A. The coil of geophone assembly 14A is connected in parallel with the coil of geophone assembly 14 and to conductors leading to the jacks opposite the No. 6 position. Accordingly, the index 87 of the flange 27a of cable section 96 is opposite numeral 6 (which is upside down), and the index 87 of the flange 27a of cable section 97 is opposite the numeral 6. Similarly, the indexes of the flanges connected to the geophone assembly 14 are opposite the numeral 6. It will thus be seen that the desired connections of the geophones may be readily effected, it being understood the remaining pairs of geophones are similarly connected to the remaining pairs of conductors by similarly assembling cable sections 94—99. The geophone assembly 13 is sealed at its left end by a disc or closure 13a.

The system of Fig. 10, as a whole, is diagrammatically illustrated in Fig. 11. The coil 19b of the assembly 19A is, of course, shown connected by conductors to a double pair of jacks identified by the letter "A," one pair being at one end and the other pair at the other end of the geophone case or housing. Similarly, the coil 19c is connected to like double pairs of jacks. Since the pair of plugs of the associated cable sections located in the No. 1 position complete the connections to coils 19b and 19c, the signals therefrom are mixed in the circuit comprising the pair of conductors 201. It will be observed that these conductors extend from the recorder and boat (not shown in Fig. 11) throughout the cable including all fourteen geophone assemblies. Only coils 19b and 19c are connected to the pair of conductors 201, since all other cable flanges are differently associated with the remaining geophone assemblies. More particularly, the cable flanges of assembly 18A are associated therewith, with the indexes opposite the No. 2 positions. Thus, the geophone coil 18b is connected to the pair of conductors 202. The geophone itself has in this instance been shown in detail with the housing omitted in order that the diagram as a whole may be given a greater functional meaning. To the left of that geophone the cable is shown broken away. It will be understood, however, that the next geophone coil will be connected to the pair of conductors 202, and additional pairs of geophone coils to the pairs of conductors 203 and 204. One geophone coil will also be connected in parallel with the coil 15c and to the pair of conductors 205. These switching or paralleling operations are simply accomplished by successively assembling the cable assemblies with their indexes in proper relation to the numbered positions of the flanges of the geophone assemblies. Thus, the indexes of the cable flanges associated with the geophones 14A—14, 13A—13, will be assembled respectively in the No. 6 and No. 7 positions of the housings in order to connect coils 14b and 14c to the pair of conductors 206; and to connect coils 13b and 13c to the pair of conductors 207.

If it is desired to mix the signals from three geophones, as from coils 18b, 19c and 19b, it is only necessary to couple the associated cable sections to the selected geophone housing with the indexes on the flanges of such cable sections located opposite the No. 1 positions. Thus, any geophone coil will be connected in parallel with any other coil if the indexes of the cable sections are assembled to the geophone housings in the same numbered positions. Mixing of signals from any selected group of geophones may readily be accomplished.

The general practice of utilizing several geophones in parallel for each trace is familiar to those skilled in the art and is desirable field practice for the improvement of seismic records where there prevails a high noise level or high amplitude of spurious signals due to near surface effects. In some areas it has been found necessary to use ten or more geophones per trace in order to distinguish "reflections" over "noise." The present invention provides means for an underwater survey and, as indicated in Fig. 10, any desired number of geophones may be paralleled.

While the geophones may be of any suitable type, a geophone of the velocity type is shown in Fig. 11. It comprises a magnetic structure 100 which is provided with a central pole piece 101. A plurality of turns of wire forming the coil 18b are wound on a spool or form 103 which is resiliently mounted by springs 104 axially of and complementary with the central pole piece 101. Coil 18b is terminated in glass-seal terminal posts 105 which extend through a hermetically sealed enclosure 106 for the assembly. This device may be taken as illustrative of one of several types of geophones or vibration-sensitive devices now in use, and which may readily be adaptable to the system here-to-fore described.

In utilizing the method and apparatus of the above-described modification of the invention, it has been found that the cable comes to rest upon the ocean floor with the longitudinal axis sufficiently horizontal as not to require compensation for deviation of each geophone from the horizontal. For applications in which corrections should be made, a double-gimbal mounting may be utilized so that the geophone unit itself will remain vertical regardless of the position of the geophone housing. Such a mounting is shown in Fig. 16 wherein the bottom-heavy cradle 58 of Figs. 2 and 3, with the detector 30 nested therein, is mounted on a ring 111 provided with pivots 112 and 113, providing a rotational axis perpendicular to, and intersecting, the pivotal axis of the cradle 58. More specifically, the bottom-heavy cradle 58 of Fig. 16 has its anti-friction bearings 60 and 61 carried by mountings 110, forming a part of the gimbal ring 111. The ring 111 is provided with pivots or shafts which are mounted in the geophone case in the same manner as are shafts 62 and 63 in the construction of Fig. 2. Shafts 62, 63, 112 and 113 are provided with electrical paths for transferring signals generated by geophone 30 through the axis of rotation to the jacks carried by the housing (not shown in Fig. 16). The electrical path of the double-gimbal arrangement includes conductors 50 and 51, insulated plug arrangement (not shown, but similar to plugs 48 and 52 of Figs. 2 and 3), spring-biased plunger 114, conductors 115 and insulated plug 116, shown in section at the left of Fig. 16.

The construction so far described is characterized by the provision of the interchangeable geophone units and the interchangeable cable sections. Such a construction embodying the features of the present invention eliminates many problems which would otherwise arise in the field, provides for many contingencies, and permits a wide variety of operating methods to meet widely varying conditions. Such an arrangement embodying the present invention is particularly desirable for underwater exploration, since in the course of time, it is possible that certain geophones or cable sections may be damaged by sharp coral formations or by obstacles encountered during the towing of the spread from one location to another. When any unit fails or when the abrasion-resistant covering is broken, new units or cable sections may be readily substituted, thus eliminating time consuming delays. The construction permitting the selective connections between cable sections and geophone units is such that the surveying apparatus is of a relatively streamlined character. With the apparatus thus constructed, the possibility of impalement upon, or the wedging into, sub-surface obstacles is minimized, the cable unit 12 being entirely free of branches, divisions, extensions and any unwieldly appending components which would readily lodge behind and jam in under-water obstacles rough in character.

In summary, it has been found that with a surveying apparatus of the character disclosed, underwater surveying can be accomplished in less time over a given area than heretofore has been required in land surveys, and there has been avoided the need to discontinue operations when the waves are higher than those permitting small-boat operation. Moreover, there is assured the uniform placement of each geophone in a straight line with equal spacing therebetween. There has been found the further advantage that the towing of the cable-geophone assembly from one location to the other, particularly in a sandy or muddy bottom, embeds the cable and assemblies into the bottom, keeps them generally horizontal, and assures efficient transmission of the seismic signals from the earth to the geophone housing for production of seismic signals of amplitude higher than would be expected on dry land with comparable conditions of operation.

Though a preferred embodiment of the invention has been disclosed in detail, it is to be understood that further modifications within the scope of the appended claims may now suggest themselves.

What is claimed is:

1. A seismic surveying apparatus in which a plurality of detectors are respectively separated and electrically interconnected by cable sections, each cable section having pairs of conductors corresponding in number with the number of said plurality of detectors, characterized by conducting members forming terminal assemblies between each cable section and a detector, said conducting members, one of each for each conductor, being circumferentially symmetrically disposed with respect to the axis of each cable section, means for interconnecting corresponding conducting members of adjacent terminal assemblies, and means for connecting each said detector to conductors leading to said assemblies whereby each said detector may be selectively connected to any pair of said conductors.

2. A seismic surveying apparatus which includes a plurality of detectors each enclosed within a housing and spaced one from the other and interconnected by cable sections having pairs of conductors corresponding in number with the number of detectors, the combination of switching means for connecting said detectors to selected pairs of said conductors comprising a plurality of pairs of terminals supported at each end of each detector housing in symmetrical array circumferentially of the longitudinal axis thereof, a plurality of pairs of cooperating terminals, one for each pair of conductors, circumferentially symmetrically disposed with respect to the longitudinal axis of its associated cable section, said symmetrical arrays of terminals providing for electrical contact of said terminals of one array with those of another in any selected circumferential position, means connecting each detector to a pair of terminals at each end of the housing thereof, means at each detector housing for interconnecting corresponding terminals at opposite ends thereof, and means securing said arrays of terminals in assembled circuit-completing positions for establishing selected electrical circuits which extend from one end of said assembled cable sections to the other.

3. A seismic surveying apparatus in which a plurality of detectors are respectively separated and electrically interconnected by cable sections, each cable section having pairs of conductors corresponding in number with the number of said plurality of detectors, characterized by conducting members forming terminal assemblies between each cable section and a detector, said conducting members, one of each for each conductor, being disposed at each end of each cable section in cooperative array with respect to conducting members associated with each of said detectors, means for interconnecting corresponding conducting members of said terminal assemblies of each detector, and means for connecting each said detector to conductors leading to said assemblies whereby each said detector may be selectively connected to any pair of said conductors.

4. A seismic surveying apparatus in which a plurality of detectors are respectively separated and electrically interconnected by cable sections, each cable section having pairs of conductors corresponding in number with the number of said plurality of detectors, characterized by plug and jack assemblies between each cable section and a detector, said plugs and jacks, one of each for each conductor, being circumferentially symmetrically disposed with respect to the axis of each cable section, means at each detector for interconnecting corresponding elements of said plug and jack assemblies, and means for connecting each said detector to conductors leading to said assemblies whereby each said detector may be selectively connected to any pair of said conductors.

5. A seismic surveying apparatus which includes a plurality of detectors each enclosed within a housing and spaced one from the other and interconnected by cable sections having pairs of conductors corresponding in number with the number of detectors, the combination of switching means for connecting said detectors to selected pairs of said conductors comprising a plurality of pairs of jacks supported at each end of each detector housing in symmetrical array circumferentially of the longitudinal axis thereof, electrical conductors extending through said housing and interconnecting said jacks at one end of said housing to corresponding jacks at the opposite end thereof, a plurality of pairs of plugs, one for each pair of conductors, circumferentially symmetrically disposed with respect to the longitudinal axis of its associated cable section, said symmetrical array of plugs and jacks providing for insertion of said plugs into said jacks in any selected circumferential position, means connecting each detector to a pair of jacks at each end of the housing thereof, and means securing said jacks and plugs in assembled circuit-completing positions for establishing selected electrical circuits which extend from one end of said assembled cable sections to the other.

6. In a seismic surveying system in which there are provided a plurality of housings each including a detector, separated by cable sections, each said cable section including pairs of conductors corresponding in number with the number of said detectors, and said housings including a corresponding number of pairs of conductors, the combination of pairs of jacks and plugs, in number equal to the number of said detectors, respectively carried by said housings and said cable sections, means for connecting each detector to corresponding conductors in its associated housing, and means for connecting the cable sections to said housings in selectively different angular positions to establish different circuits for different detectors, which circuits extend throughout said cable sections and housings for transmission of seismic signals through a plurality of circuits.

7. In a seismic surveying system of the class in which signals from a plurality of seismic detectors are to be recorded either singly or combined, means for connecting said detectors to desired conducting paths for transmission of signals to a recorder, comprising a plurality of multi-conductor cable sections terminated at both ends in a closure member comprising identical multi-conductor elements, each said element being characterized by pairs of terminals disposed radially and equi-angularly on the face of and symmetrically to the axis of said elements, a housing for each of said detectors characterized by a plurality of pairs of terminals oriented in cooperative relationship with respect to those of said elements, means for fastening each closure member to a housing in a selected angular position, and means extending through said housing for interconnection of said terminals.

8. A seismic surveying apparatus in which a plurality of detectors are respectively separated and electrically interconnected by cable sections, each cable section having a plurality of pairs of conductors, characterized by conducting members forming terminal assemblies between each cable section and a detector, said conducting members, one of each for each conductor, being circumferentially symmetrically disposed with respect to the axis of each cable section, means for interconnecting conducting members of adjacent terminal assemblies, and means for connecting each said detector to conductors leading to said assemblies whereby each said detector may be selectively connected to any pair of said conductors.

9. A seismic surveying apparatus which includes a plurality of detectors each enclosed within a housing and spaced one from the other and interconnected by cable sections having a plurality of pairs of conductors extending therethrough, the combination of switching means for connecting selected groups of said detectors to selected pairs of said conductors comprising a plurality of pairs of terminals supported adjacent each end of each detector housing in symmetrical array about an axis extending longitudinally of the detector housing, conductors interconnecting corresponding terminals at the respective ends of each housing, a plurality of pairs of cooperating terminals carried adjacent the respective ends of each cable section and disposed in like symmetrical array with those adjacent the end of each said housing, means connecting each detector to a pair of terminals adjacent the respective ends of the housing thereof, the symmetrical arrays of the terminals of said cable sections and of said housing being relatively rotatable in selection of the pair of conductors to which selected detectors are connected, and means securing said cable sections to said housings with said arrays of terminals in their selected circuit-completing positions for establishing the selected electrical circuits which extend from one end of the assembled cable sections to the other.

KENNETH W. McLOAD.

REFERENCES CITED

The following references are of record in the file of this patent:

UNITED STATES PATENTS

| Number | Name | Date |
| --- | --- | --- |
| 2,191,120 | Slichter | Feb. 20, 1940 |
| 2,191,121 | Slichter | Feb. 20, 1940 |
| 2,241,428 | Silverman | May 13, 1941 |
| 2,329,793 | Smith | Sept. 21, 1943 |
| 2,410,805 | Black | Nov. 12, 1946 |
| 2,423,591 | Flude | July 8, 1947 |
| 2,440,903 | Massa | May 4, 1948 |

FOREIGN PATENTS

| Number | Country | Date |
| --- | --- | --- |
| 367,545 | Germany | Jan. 23, 1923 |